United States Patent
Ferlin et al.

(10) Patent No.: US 10,266,016 B2
(45) Date of Patent: Apr. 23, 2019

(54) BEAD FOR A TIRE FOR A HEAVY CIVIL-ENGINEERING VEHICLE

(75) Inventors: Olivier Ferlin, Clermont-Ferrand (FR); François Harle, Clermont-Ferrand (FR)

(73) Assignees: Compagnie Generale Des Etablissements Michelin, Clermont-Ferrand (FR); Michelin Recherche Et Technique S.A., Granges-Paccot (CH)

( * ) Notice: Subject to any disclaimer, the term of this patent is extended or adjusted under 35 U.S.C. 154(b) by 167 days.

(21) Appl. No.: 14/125,080

(22) PCT Filed: Jun. 6, 2012

(86) PCT No.: PCT/EP2012/060652
§ 371 (c)(1),
(2), (4) Date: Feb. 3, 2014

(87) PCT Pub. No.: WO2012/168274
PCT Pub. Date: Dec. 13, 2012

(65) Prior Publication Data
US 2014/0150950 A1  Jun. 5, 2014

(30) Foreign Application Priority Data
Jun. 7, 2011  (FR) ...................................... 11 54933

(51) Int. Cl.
*B60C 15/00* (2006.01)
*B60C 9/02* (2006.01)
(Continued)

(52) U.S. Cl.
CPC .............. *B60C 15/04* (2013.01); *B60C 15/06* (2013.01); *B60C 15/0607* (2013.01);
(Continued)

(58) Field of Classification Search
CPC . B60C 15/00; B60C 15/0009; B60C 15/0036; B60C 15/0054; B60C 15/0063; B29D 30/06
See application file for complete search history.

(56) References Cited

U.S. PATENT DOCUMENTS 3,709,277 A * 1/1973 Montagne .............. B29D 30/00
                                                         152/558
4,705,091 A * 11/1987 Iuchi ...................... B60C 15/00
                                                         152/534
(Continued)

FOREIGN PATENT DOCUMENTS

CN   1230924 A   10/1999
EP   0958946 A2  11/1999
(Continued)

OTHER PUBLICATIONS

PCT/EP2012/060652—International Search Report (English translation included), dated Aug. 8, 2012, 2 pages.
(Continued)

*Primary Examiner* — Justin R Fischer
(74) *Attorney, Agent, or Firm* — Dickinson Wright PLLC

(57) ABSTRACT

The invention relates to improving the endurance of a bead of a radial tire for a heavy vehicle of construction plant type by reducing the compression to which the turn-up is subjected when the tire is driven on. According to the invention, for a tire for a heavy vehicle of construction plant type comprising two beads intended to come into contact with a rim having two rim flanges, a carcass reinforcement comprising at least one carcass reinforcement layer having a main part wrapped, within each bead, from the inside towards the outside of the tire, around a bead wire of substantially circular meridian section, to form a turn-up, a filling element extending the bead wire radially towards the outside and axially separating the main part and the turn-up, the distance (d) between a first segment of turn-up and the main part decreasing continuously, radially towards the outside, from the bead wire as far as a minimum distance ($d_1$), the distance ($d_2$) between a second segment of turn-up, extending the first segment of turn-up radially towards the outside, and the main part is substantially constant and equal (Continued)

to the minimum distance ($d_1$) between the first segment of turn-up and the main part.

13 Claims, 1 Drawing Sheet

(51) Int. Cl.
    *B29D 30/06*     (2006.01)
    *B60C 15/04*     (2006.01)
    *B60C 15/06*     (2006.01)

(52) U.S. Cl.
    CPC ........ *B29D 30/06* (2013.01); *B60C 2015/009* (2013.01); *B60C 2200/065* (2013.01); *Y10T 152/10819* (2015.01); *Y10T 152/10846* (2015.01)

(56) References Cited

U.S. PATENT DOCUMENTS

| | | | |
|---|---|---|---|
| 5,236,031 A * | 8/1993 | Honbo | B60C 15/0027 |
| | | | 152/541 |
| 6,478,064 B1 | 11/2002 | Ueyoko | |
| 6,820,670 B1 | 11/2004 | Ueyoko et al. | |
| 7,868,073 B2 * | 1/2011 | Kameda | C08K 5/12 |
| | | | 152/510 |
| 2003/0089440 A1 | 5/2003 | Ueyoko et al. | |
| 2004/0007305 A1 | 1/2004 | Ueyoko | |
| 2009/0183813 A1 | 7/2009 | Nakamura | |

FOREIGN PATENT DOCUMENTS

| | | | |
|---|---|---|---|
| EP | 1985469 A1 | | 10/2008 |
| GB | 2104461 | * | 3/1983 |
| JP | 2000-198326 | | 7/2000 |
| JP | 2001-071716 | | 3/2001 |
| JP | 2009-113715 | * | 5/2009 |

OTHER PUBLICATIONS

Office Action in Chinese Application No. CN100738 dated May 21, 2015.

Japanese Office Action dated Nov. 25, 2016 (dated Nov. 30, 2016) with English Language Translation, issued in correspoding Japanese Patent Application No. 2014-514050.

* cited by examiner

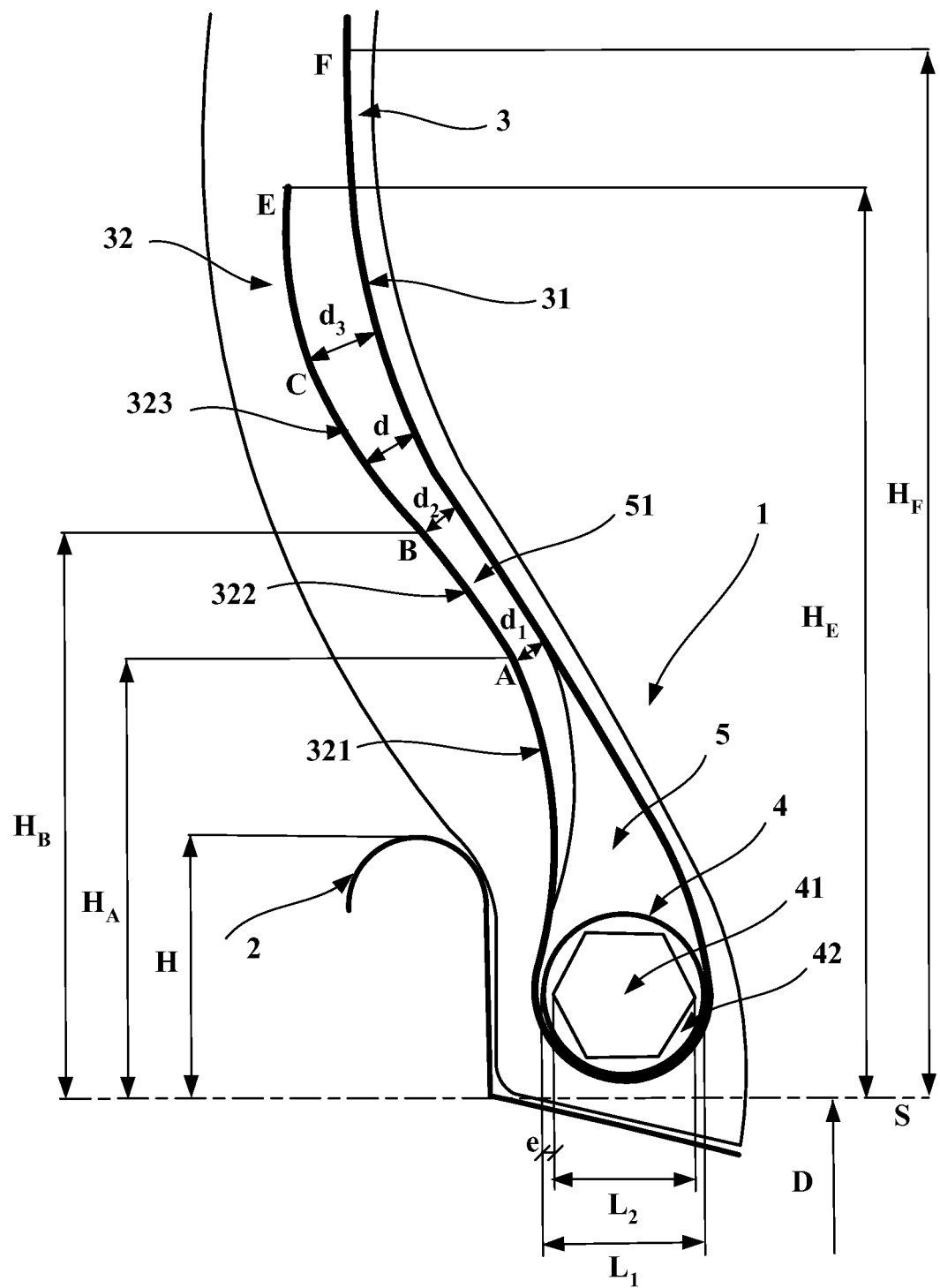

BEAD FOR A TIRE FOR A HEAVY CIVIL-ENGINEERING VEHICLE

This application claims benefit of the filing date of PCT/EP2012/060652, filed Jun. 6, 2012, which claims the benefit of FR1154933, filed Jun. 7, 2011, the entire contents of each of which are incorporated herein by reference for all purposes.

FIELD

The present invention relates to a radial tire intended to be fitted to a heavy vehicle of construction plant type.

DESCRIPTION OF RELATED ART

Although not restricted to this type of application, the invention will be more particularly described with reference to a radial tire of large size intended to be mounted, for example, on a dumper, a vehicle for transporting materials extracted from quarries or open cast mines. The nominal diameter of the rim of such a tire, within the meaning of the European Tire and Rim Technical Organisation (ETRTO) standard, is a minimum of 25 inches.

A tire comprises two beads which provide the mechanical connection between the tire and the rim on which it is mounted, the beads being joined respectively by two sidewalls to a tread intended to come into contact with the ground via a tread surface.

In what follows, the circumferential, axial and radial directions respectively denote a direction tangential to the tread surface in the direction of rotation of the tire, a direction parallel to the axis of rotation of the tire and a direction perpendicular to the axis of rotation of the tire. "Radially on the inside, or respectively radially on the outside" means "closer to or, respectively, further away from the axis of rotation of the tire". "Axially on the inside or, respectively, axially on the outside" means "closer to or, respectively, further away from, the equatorial plane of the tire", the equatorial plane of the tire being the plane that passes through the middle of the tread surface of the tire and perpendicular to the axis of rotation of the tire.

A radial tire more particularly comprises a reinforcement, comprising a crown reinforcement, radially on the inside of the tread, and a carcass reinforcement, radially on the inside of the crown reinforcement.

The carcass reinforcement of a radial tire for a heavy vehicle of construction plant type usually comprises at least one carcass reinforcement layer made up of reinforcing elements, generally metallic, coated in a polymer coating material. The carcass reinforcement layer comprises a main part, joining the two beads together and wrapped, within each bead, from the inside towards the outside of the tire, around a bead wire to form a turn-up. The metallic reinforcing elements are substantially parallel to one another and make, with the circumferential direction, an angle of between 85° and 95° in the case of the main part, and an angle of between 75° and 105° in the case of the turn-up.

The bead wire comprises a circumferential reinforcing element, usually metallic, surrounded by at least one material which, and this list is not exhaustive, may be made of polymer or of textile. The segment of bead wire in contact with the carcass reinforcement in particular contributes to reacting tensile forces in the carcass reinforcement upon inflation, by coupling with the carcass reinforcement. This contribution towards reacting tensile forces is dependent on the torsional stiffness of the bead wire and on the geometry of the turn-up. In the usual case in which the bead wire has high torsional stiffness, the tension forces on inflation are essentially reacted by the bead wire, with the turn-up making a secondary contribution.

The turn-up, within each bead, allows the carcass reinforcement layer to anchor to the bead wire. In the case of a tire for a heavy vehicle of construction plant type, the turn-up is generally long, which means to say that its free end is radially closer to the axially outermost point of the carcass reinforcement in the side wall of the tire than it is to the radially outermost point of the bead wire.

Each bead also comprises a filling element which extends the bead wire radially outwards. The filling element is made from at least one polymer filling material. The filling element may be made of a radial stack of at least two different polymer filling materials. The filling element axially separates the main part and the turn-up.

When the vehicle is being driven along, the tire, mounted on its rim, inflated and compressed under the load of the vehicle, is subjected to bending cycles, particularly in its beads and in its sidewalls.

The bending cycles lead to variations in curvature which are combined with variations in the tension in the metallic reinforcing elements of the main part and of the turn-up.

As it flexes, the bead wraps around the rim flange with which it is in contact: it behaves mechanically in bending like a beam the respectively outer and inner axes of which are the main part and the turn-up, and the length of which is defined by the length of turn-up. The flexing of the bead is governed by the geometry of the rim flange and, in particular, by the height of the rim flange as defined by the usual standards relating to tires, such as, for example, the ETRTO standards. The turn-up, subjected to the bending cycles, undergoes compressive deformations likely to lead to its fatigue failure and therefore to a reduction in the endurance of the bead and in the life of the tire. The longer the turn-up is, the greater this sensitivity to compression because the end of the turn-up is then positioned radially in regions of the tire that suffer from significant bending.

Document EP 2 216 189 describes a tire bead the endurance of which is improved by reducing the compressive deformations in the turn-up when the bead flexes on the rim when in use. This objective is achieved by a turn-up which is such that the distance between the turn-up and the main part decreases continuously, radially towards the outside, from the bead wire as far as a minimum distance and then increases continuously as far as a maximum distance. The turn-up extends radially on the outside of that point of the turn-up that corresponds to the maximum distance between the turn-up and the main part.

SUMMARY

The inventors have set themselves the objective of further increasing the endurance of the beads of a radial tire for a heavy vehicle of construction plant type by reducing the extent to which the turn-up is placed under compression when the tire is being driven on.

According to the invention, this objective has been achieved by a tire for a heavy vehicle of construction plant type comprising:
  two beads intended to come into contact with a rim having two rim flanges,
  a carcass reinforcement comprising at least one carcass reinforcement layer having a main part wrapped, within each bead, from the inside towards the outside of the tire, around a bead wire of substantially circular meridian section, to form a turn-up, a filling element extending the bead wire radially towards the outside and axially separating the main part and the turn-up, the distance between a first segment of turn-up and the main part decreasing continuously, radially towards the outside, from the bead wire as far as a minimum distance, the distance between a second segment of turn-up, extending the first segment of turn-up radially towards the outside, and the main part being substantially constant and equal to the minimum distance between the first segment of turn-up and the main part.

According to the invention, it is advantageous for the distance between a second segment of turn-up, extending the first segment of turn-up radially towards the outside, and the main part to be substantially constant and equal to the minimum distance between the first segment of turn-up and the main part.

The first segment of turn-up extends radially outwards from the bead wire. The distance between the first segment of turn-up and the main part decreases continuously from the diameter of the bead wire to a minimum value.

The second segment of turn-up extends radially outwards in the continuation of the first segment of turn-up. The distance between any point on the second segment of turn-up and the main part, measured perpendicular to the main part, is substantially constant and equal to the minimum distance reached at the radially outermost point of the first segment of turn-up, i.e. this distance may vary substantially between 0.9 times and 1.1 times the minimum distance.

The second segment of turn-up corresponds substantially to the segment of bead that wraps around the rim flange, and, more specifically, around the substantially circular and radially outer segment of the rim flange when the tire is being driven on. In this segment of bead, which behaves in bending like a beam, the main part, which can be likened to the exterior axis of the beam, is in extension, whereas the turn-up, which can be likened to the interior axis of the beam, is in compression. Reducing the distance between the turn-up and the main part is equivalent to reducing the distance between the exterior and interior axes of the beam, and this makes it possible to reduce the extent to which the interior axis, i.e. the turn-up, is placed under compression.

It is also advantageous for the substantially constant distance between the second segment of turn-up and the main part to be at most equal to the diameter of the substantially circular meridian section of the bead wire divided by 4, preferably to the diameter of the substantially circular meridian section of the bead wire divided by 6.

The diameter of the substantially circular meridian section of the bead wire is the diameter of the circle circumscribing the meridian section of the bead wire, which bead wire usually consists of a circumferential metallic reinforcing element surrounded by a coating element, often made of a polymer material.

The distance between the second segment of turn-up and the main part needs to be low enough, i.e. the coupling between the second segment of turn-up and the main part needs to be high enough, to achieve a significant reduction in the extent to which the turn-up is subjected to compression, i.e. to achieve a near zero compression or even an extension.

It is further advantageous for the radial distance between the radially innermost point of the second segment of turn-up and the axial straight line positioned radially at the nominal diameter of the rim to be at least equal to the radial height of the rim flange.

It is also advantageous for the radial distance between the radially innermost point of the second segment of turn-up and the axial straight line positioned radially at the nominal diameter of the flange to be at most equal to 2 times, preferably 1.2 times, the radial height of the rim flange.

Specifically, one important feature is the radial position of the second segment of turn-up with respect to the rim flange. According to the usual standards relating to the tire, such as the ETRTO standards, the rim is characterized in particular by its nominal diameter and the rim flange is characterized by its radial height. The radial height of the rim flange is measured between the axial straight line parallel to the axis of rotation of the tire and passing through the nominal diameter of the rim or rim seat diameter and the radially outermost point of the rim flange.

The radial position of the second segment of turn-up with respect to the rim flange is governed by the radial distance between the radially innermost point of the second segment of turn-up and the axial straight line positioned radially at the nominal diameter of the rim. A range of radial distances comprised between a minimum value equal to the radial height of the rim flange and a maximum value equal to 2 times, preferably 1.2 times, the radial height of the rim flange, guarantees that the second segment of turn-up is positioned in the bending region for which a reduction in the extent to which the turn-up is subjected to compression is intended.

The difference between the radial distance between the radially outermost point of the second segment of turn-up and the axial straight line positioned radially at the nominal diameter of the rim, and the radial distance between the radially innermost point of the second segment of turn-up and the axial straight line positioned radially at the nominal diameter of the rim is advantageously at most equal to the radial height of the rim flange.

This feature defines the maximum value of the radial height of the second segment of turn-up, which makes it possible to limit the second segment of turn-up to that segment of turn-up that is subjected to the highest compressive stress.

Furthermore, the radially outermost point of the second segment of turn-up corresponds substantially to a point of inflexion of the turn-up, i.e. to a reversal in the direction of curvature of the turn-up radially on the outside of which the turn-up is in extension.

The distance between a third segment of turn-up extending the second segment of turn-up radially outwards, and the main part advantageously reaches a maximum distance at a point on the third segment of turn-up.

The third segment of turn-up extends the second segment of turn-up radially outwards as far as the end of the turn-up, i.e. the radially outermost point of the turn-up. The third segment of turn-up is therefore radially on the outside of the region of flexing on the rim flange.

In this third segment of turn-up it is advantageous for the distance between the turn-up and the main part to increase with respect to the minimum distance between the second segment of turn-up and the main part. This is because this gives the turn-up a sinuous initial geometry when making the transition from the first to the second and then to the third segment of turn-up. Upon inflation, this sinuous initial geometry will evolve towards a straighter deformed geometry of the turn-up, and this will contribute to the introduction of tension into the turn-up. This tension preloading of the turn-up upon inflation will thus make it possible to avoid the turn-up becoming subjected to compression as the bead flexes on the rim flange under driving conditions.

This increase in distance, in the third segment of turn-up, also makes it possible to reduce the coupling between the turn-up and the main part in this segment of turn-up. This contributes to reducing the shear forces in the filling element in this region close to the end of the turn-up, which is a region particularly sensitive to cracking.

According to one preferred embodiment, the maximum distance between the third segment of turn-up and the main part is at least equal to 1.2 times, preferably 2 times, the distance between the second segment of turn-up and the main part.

A significant increase in the distance from the turn-up to the main part, when making the transition from the second to the third segment of turn-up, is in fact necessary in order to have a sinuous initial geometry for the turn-up that is sufficiently pronounced to allow the turn-up to be placed under sufficient tension preload to avoid the turn-up going into compression under traffic conditions.

According to one particular embodiment, the point of the third segment of turn-up at which the maximum distance between the third segment of turn-up and the main part is reached is the radially outermost point of the turn-up.

In this particular case, the maximum decoupling is achieved at the end of the turn-up. This configuration more specifically makes it possible to reduce the risk of cracks spreading from the end of the turn-up through the filling element.

According to another embodiment, with the carcass reinforcement layer made up of reinforcing elements coated in a polymer coating material, and with the filling element having a filling element segment contained axially between the second segment of turn-up and the main part, made of a polymer filling material, it is advantageous for the polymer filling material of the segment of filling element contained axially between the second segment of turn-up and the main part to be identical to the polymer coating material of the carcass reinforcement layer.

In the second segment of turn-up, the thickness of the filling element is reduced which, on the one hand, implies an increase in shear forces in the filling element and on the other hand implies a reduction in the dissipation of heat of the polymer filling material of which the filling element is made. The inventors have considered it advantageous to use, in this region of strong coupling between the turn-up and the main part, a polymer filling material that is stiff and a good dissipater of heat. Because the polymer coating material that coats the reinforcing elements of the carcass reinforcement layer is usually stiff and a good dissipater of heat it can therefore be used for the filling element, in the second segment of turn-up. Moreover, having the carcass reinforcement layer and the filling element made of the same kind of polymer material avoids singularities in discontinuity at the interfaces between the turn-up and the filling element and between the filling element and the main part, respectively, thus reducing the risks of cracking in this region.

It is advantageous for the radial distance between the radially outermost point of the turn-up, and the axial straight line positioned radially at the nominal diameter of the rim to be at least equal to 0.8 times the radial distance between the axially outermost point of the main part and the axial straight line positioned radially at the nominal diameter of the rim.

In other words, the radial position of the end of the turn-up is close to that of the axially outermost point of the main part, this point, at which the tangent to the main part is radial, defining the width of the tire at the sidewall. This radial position is characteristic of a long turn-up.

A long turn-up contributes to reacting tensile forces in the carcass reinforcement layer upon inflation, provided that the torsional stiffness of the bead wire is sufficiently low.

Depending on whether the end of the turn-up is positioned radially on the inside or radially on the outside of the axially outermost point of the carcass reinforcement, as the sidewall flexes under driving conditions, the end of the turn-up may be either pulled radially towards the outside and placed under tension or, on the other hand, be pushed radially inwards and placed under compression. The radial position of the end of the turn-up therefore governs whether or not the turn-up is placed under compression.

Finally, according to one advantageous embodiment, the minimum thickness of the polymer coating element of the bead wire is at least equal to 0.04 times the diameter of the meridian section of the circumferential reinforcing element of the bead wire.

The diameter of the meridian section of the circumferential reinforcing element of the bead wire is the diameter of the circle circumscribing the meridian section of the circumferential reinforcing element of the bead wire. The minimum thickness of the polymer coating element of the bead wire is equal to half the difference between the diameter of the substantially circular meridian section of the bead wire and the diameter of the meridian section of the circumferential reinforcing element of the bead wire.

This property of minimum thickness of the polymer coating element of the bead wire underpins the torsional softening of the bead wire or the reduction in torsional stiffness of the bead wire by comparison with a bead wire of the prior art which has very high torsional stiffness. The circumferential reinforcing element of a bead wire of the prior art is, for example, made of a circumferential winding of layers of individual metallic wires coated in a polymer material. The introduction of a polymer coating element around the circumferential reinforcing element allows decoupling between the circumferential reinforcing element of the bead wire and the carcass reinforcement layer in the interface region between a radially inner portion of the circumferential reinforcing element and the carcass reinforcement layer.

Upon inflation, under the effect of tension being applied to the carcass reinforcement, the bead wire, around which the carcass reinforcement layer is wrapped to form a turn-up, behaves like a pulley subjected to a torsional moment under the action of the main part and of the turn-up which can be likened to the strands of a thread passing over the pulley. If the pulley is sufficiently soft, i.e. if its torsional rigidity is sufficiently low, the rotation of the bead wire upon inflation will contribute to the application of tension to the turn-up.

In this particular instance the softening of the bead wire is achieved by increasing the thickness of the polymer coating element of the bead wire by comparison with a bead wire of the prior art.

It is also conceivable to choose, for a given thickness of polymer coating element, a polymer coating material that is less rigid, characterized by having an elastic modulus at 10% elongation which is not as high.

It is finally conceivable to choose a bead wire the circumferential reinforcing element of which is soft by design such as, for example, a bead wire of what is known as the braided type, consisting of a collection of metal cords.

BRIEF DESCRIPTION OF THE FIGURES

The features of the invention will be better understood with the aid of the description of the attached FIG. 1, which shows a view in cross section, on a meridian plane, of the bead of a tire for a heavy vehicle of construction plant type, according to the invention.

DETAILED DESCRIPTION OF SPECIFIC EMBODIMENTS

In order to make it easier to understand, FIG. 1 has not been drawn to scale.

FIG. 1 depicts a bead 1 of a tire for a heavy vehicle of construction plant type according to the invention, in contact with a rim flange 2, comprising a circular portion around which the bead wraps as it flexes under driving conditions.

The rim flange has a radial height H, measured between the radially outermost point of the circular portion of the rim flange and of the straight line S that passes through the nominal diameter D of the rim, or seat diameter, as defined, for example, by the ETRTO standards.

The bead 1 comprises a carcass reinforcement having a single carcass reinforcement layer 3 made of metal reinforcing elements. The carcass reinforcement layer comprises a main part 31 wrapped, from the inside towards the outside of the tire, around a bead wire 4 to form a turn-up 32. The turn-up 32 and the main part 31 are separated axially by a filling element 5 extending radially on the outside of the bead wire 4. In the configuration shown in FIG. 1, the filling element 5 is made of a radial stack of two polymer filling materials.

The turn-up 32 is made of three segments of turn-up 321, 322 and 323, extending radially from the last point of contact (not depicted) with the bead wire 4 as far as the end point E of the turn-up 32. The end point E of the turn-up 32 is positioned radially at the radial distance $H_E$, with respect to the straight line S passing through the nominal diameter D of the rim. The radial distance $H_E$ is preferably at least equal to 0.80 times the radial distance $H_F$ of the axially outermost point F of the carcass reinforcement layer 3 with respect to the straight line S passing through the nominal diameter D of the rim: this is what characterizes a long turn-up 32.

The first segment of turn-up 321 extends from the last point of contact with the bead wire (this point is not depicted) as far as the point A. The distance between the first segment of turn-up 321 and the main part 31 decreases continuously from the width $L_1$ of the bead wire as far as a distance $d_1$, which is the minimum distance between the turn-up 32 and the main part 31.

The second segment of turn-up 322 extends the first segment of turn-up 321 radially outwards: it is bounded radially on the inside by the point A and radially on the outside by the point B, these points being respectively positioned radially at the radial distances $H_A$ and $H_B$ with respect to the straight line S that passes through the nominal diameter D of the rim. The distance $d_2$ between the second segment of turn-up 322 and the main part 31 is substantially constant and equal to the minimum distance $d_1$ of the first segment of turn-up, to within + or −10%. The filling element 5 has a filling element segment 51, preferably made of a polymer filling material identical to the polymer coating material used on the metal reinforcing elements of the carcass reinforcement layer 3.

Finally, the third segment of turn-up 323 extends the second segment of turn-up 322 radially outwards: it is bounded radially on the inside by the point B and radially on the outside by the point E. The distance d between the third segment of turn-up 323 and the main part 31 has a maximum value $d_3$ at a point C.

The bead wire 4 is made of a circumferential reinforcing element 41 of which the meridian section, which in the instance depicted is hexagonal, is inscribed inside a circle of diameter $L_2$, which defines the axial width of the circumferential reinforcing element 41, and of a coating element 42, usually made of a polymer material, the substantially circular meridian section of which has a diameter $L_1$, which defines the axial width of the bead wire 4, coating element 42 included. The minimum thickness e of the polymer coating element 42 of the bead wire 4 is defined as being half the difference between the axial width $L_1$ of the bead wire 4 and the axial width $L_2$ of its circumferential reinforcing element 41. The thickness of the coating element 42 of the bead wire 4 can vary, as FIG. 1 shows and it is the minimum thickness e that governs the torsional stiffness of the bead wire 4. For a given polymer coating material, the greater the minimum thickness e the greater the reduction in torsional stiffness, allowing the bead wire 4 to rotate more and therefore allowing tension to be introduced into the turn-up 32 as the tire is inflated.

The invention has been studied more particularly in the case of a tire for a heavy vehicle of size 40.00R57, mounted on a rim of which the radial height H of the rim flange 2, measured with respect to the straight line S passing through the nominal diameter D of the rim, is equal to 152 mm.

The first segment of turn-up 321 extends from the last point of contact with the bead wire as far as the point A. The distance between the first segment of turn-up 321 and the main part 31 decreases continuously from the width $L_1$ of the bead wire as far as the distance $d_1$ equal to 10 mm, which is the minimum distance between the turn-up 32 and the main part 31.

The second segment of turn-up 322 extends the first segment of turn-up 321 radially outwards: it is bounded radially on the inside by the point A and radially on the outside by the point B, which points are respectively positioned radially at the radial distances $H_A$ equal to 211 mm and $H_B$ equal to 311 mm with respect to the straight line S passing through the nominal diameter D of the rim. The radial distance $H_A$ is equal to 1.4 times the radial height H of the rim flange 2, and therefore falls between 1 times and 2 times the radial height H. The difference between the radial distance $H_B$ and the radial distance $H_A$ is equal to 100 mm, and therefore less than the radial height H of the rim flange 2. The distance $d_2$ between the second segment of turn-up 322 and the main part 31 is substantially constant and equal to the minimum distance $d_1$, equal to 10 mm, of the first segment of turn-up 321.

The third segment of turn-up 321 extends the second segment of turn-up 322 radially outwards: it is bounded radially on the inside by the point B and radially on the outside by the point E. The distance d between the third segment of turn-up 323 and the main part 31 has a maximum value $d_3$ at the point C equal to 16 mm. The radial distance $H_E$ of the end point E of the turn-up 32 is equal to 465 mm. The distance between the third segment of turn-up 323 and the main part 31 at the end point E of the turn-up 32 is equal to 14 mm.

Simulations of finite-element calculations, carried out on a tire according to the invention, as depicted in FIG. 1, have shown that the extent to which the turn-up is placed under compression is reduced appreciably when the tire is being driven on.

The invention claimed is:

1. A wheel assembly for a heavy vehicle of construction plant type, comprising:
   at least two rims with a respective rim flange;
   a tire comprising:
      two beads intended to come into contact with the two rim flanges,
      a carcass reinforcement comprising at least one carcass reinforcement layer having a main part wrapped, within each bead, from the inside towards the outside of the tire, around a bead wire of substantially circular meridian section, to form a turn-up, the bead wire being made of a circumferential reinforcing element surrounded by a polymer coating element,
      a filling element extending the bead wire radially towards the outside and axially separating the main part and the turn-up, the distance (d) between a first segment of the turn-up and the main part decreasing continuously, radially towards the outside, from the bead wire as far as a minimum distance ($d_1$), wherein the distance ($d_2$) between a second segment of the turn-up, extending the first segment of the turn-up radially towards the outside, and the main part is substantially constant and equal to the minimum distance ($d_1$) between the first segment of the turn-up and the main part,
      wherein a minimum thickness (e) of the polymer coating element of the bead wire is at least equal to 0.04 times the diameter ($L_2$) of a meridian section of the circumferential reinforcing element of the bead wire, and
      the second segment is defined where the first segment tapers to a minimal distance from the main part, and ends where the turn up begins to taper out, and where the first segment tapers to the minimal distance and where the second segment's distance from the main part varies at most 10% from where the first segment tapers to a minimal distance from the main part to where the turn up begins to taper out,
      wherein the distance (d) between a third segment of the turn-up extending the second segment of the turn-up radially outwards, and the main part reaches a maximum distance ($d_3$) at a point C on the third segment of the turn-up,
      wherein a point C of the third segment of the turn-up at which the maximum distance ($d_3$) between the third segment of the turn-up and the main part is reached is a radially outermost point E of the turn-up,
      wherein the turn-up extends a radial distance HE that is so dimensioned to be at least equal to 0.80 times a radial distance HF corresponding to an axially outermost point F of the carcass reinforcement layer defining the main part.

2. The wheel assembly for a heavy vehicle of construction plant type according to claim 1, wherein the substantially constant distance ($d_2$) between the second segment of the turn-up and the main part is at most equal to the diameter ($L_1$) of the substantially circular meridian section of the bead wire divided by 4.

3. The wheel assembly for a heavy vehicle of construction plant type according to claim 2, wherein ($d_2$) is at most equal to ($L_1$) divided by 6.

4. The wheel assembly for a heavy vehicle of construction plant type according to claim 1, wherein a radial distance ($H_A$) between a radially innermost point A of the second segment of the turn-up and an axial straight line (S) positioned radially at a nominal diameter (D) of a rim is at least equal to a radial height (H) of a rim flange.

5. The wheel assembly for a heavy vehicle of construction plant type according to claim 1, wherein a radial distance ($H_A$) between a radially innermost point A of the second segment of the turn-up and an axial straight line (S) positioned radially at a nominal diameter (D) of a rim is at most equal to 2 times, the radial height (H) of a rim flange.

6. The wheel assembly for a heavy vehicle of construction plant type according to claim 5, wherein ($H_A$) is at most equal to 1.2 times (H).

7. The wheel assembly for a heavy vehicle of construction plant type according to claim 1, wherein a difference between a radial distance ($H_B$) between a radially outermost point B of the second segment of the turn-up and an axial straight line (S) positioned radially at a nominal diameter (D) of a rim, and a radial distance ($H_A$) between a radially innermost point A of the second segment of the turn-up and an axial straight line (S) positioned radially at the nominal diameter (D) of the rim is at most equal to a radial height (H) of a rim flange.

8. The wheel assembly for a heavy vehicle of construction plant type according to claim 1, wherein the maximum distance ($d_3$) between the third segment of the turn-up and the main part is at least equal to 1.2 times, the distance ($d_2$) between the second segment of the turn-up and the main part.

9. The wheel assembly for a heavy vehicle of construction plant type according to claim 8, wherein ($d_3$) is at least equal to 2 times ($d_2$).

10. The wheel assembly for a heavy vehicle of construction plant type according to claim 1, wherein the carcass reinforcement layer is made up of reinforcing elements coated in a polymer coating material, and wherein the filling element has a filling element segment contained axially between the second segment of the turn-up and the main part, made of a polymer filling material, wherein the polymer filling material of the segment of filling element contained axially between the second segment of the turn-up and the main part is identical to the polymer coating material of the carcass reinforcement layer.

11. The wheel assembly for a heavy vehicle of construction plant type according to claim 1, wherein a radial distance ($H_E$) between a radially outermost point E of the turn-up, and an axial straight line (S) positioned radially at a nominal diameter (D) of a rim is at least equal to 0.8 times a radial distance ($H_F$) between an axially outermost point F of the main part and an axial straight line (S) positioned radially at the nominal diameter (D) of the rim.

12. A wheel assembly for a heavy vehicle of construction plant type according to claim 1, wherein a point E is axially the outermost point of the turn-up and spaced axially outwardly from the axially outermost portion of the main part.

13. A method for manufacturing a tire for a heavy vehicle of construction plant type, the tire being placed on at least two rims with a respective rim flange, and tire comprising two beads intended to come into contact with the two rim flanges, comprising:
    providing a carcass reinforcement for the tire, comprising:
        at least one carcass reinforcement layer having a main part wrapped, within each bead, from the inside towards the outside of the tire, around a bead wire of substantially circular meridian section, to form a turn-up, the bead wire being made of a circumferential reinforcing element surrounded by a polymer coating element, providing a filling element extending the bead wire radially towards the outside and axially separating the main part and the turn-up;

segmenting the turn-up into a first segment, a second segment, and a third segment;

sizing with a distance (d) between the first segment of the turn-up and the main part decreasing continuously, radially towards the outside, from the bead wire as far as a minimum distance ($d_1$), sizing with a distance ($d_2$) between a second segment of the turn-up, extending the first segment of the turn-up radially towards the outside, and the main part is substantially constant and equal to the minimum distance ($d_1$) between the first segment of the turn-up and the main part, the second segment further being sized to define where the first segment tapers to a minimal distance from the main part, and ends where the tum up begins to taper out, and where the first segment tapers to the minimal distance and where the second segment's distance from the main part varies at most 10% from where the first segment tapers to a minimal distance from the main part to where the tum up begins to taper out, providing with a minimum thickness (e) of the polymer coating element of the bead wire is at least equal to 0.04 times the diameter ($L_2$) of a meridian section of the circumferential reinforcing element of the bead wire;

positioning the second segment of turn-up on the bead, so that the second segment is configured to wrap around at least one of the rim flanges while the tire is inflated and being driven on;

positioning the turn-up such that it extends a radial distance HE that is so dimensioned to be at least equal to 0.80 times a radial distance HF corresponding to an axially outermost point F of the carcass reinforcement layer defining the main part; and sizing the distance (d) between a third segment of the turn-up extending from the second segment of the turn-up radially outwards, and positioning the main part to reach a maximum distance ($d_3$) at a point C on the third segment of the turn-up, and wherein a point C of the third segment of the turn-up at which the maximum distance ($d_3$) between third segment of the turn-up and main part is reached is a radially outmost point E of turn-up.

\* \* \* \* \*